United States Patent [19]

Miura et al.

[11] Patent Number: 4,933,717
[45] Date of Patent: Jun. 12, 1990

[54] DOCUMENT FEEDER

[75] Inventors: Kazunobu Miura; Mitsuru Nagoshi; Minoru Kawano; Kazushige Murata, all of Hachioji, Japan

[73] Assignee: Konica Corporation, Tokyo, Japan

[21] Appl. No.: 293,649

[22] Filed: Jan. 5, 1989

[30] Foreign Application Priority Data

Jan. 11, 1988 [JP] Japan .................................. 63-3341
Jan. 11, 1988 [JP] Japan .................................. 63-3342
Sep. 7, 1988 [JP] Japan ............................... 63-224010

[51] Int. Cl.⁵ ............................................ G03B 27/62
[52] U.S. Cl. .................................................. 355/76
[58] Field of Search .................................. 355/75, 76

[56] References Cited

U.S. PATENT DOCUMENTS 3,677,635  7/1972  Van Auken et al. ............. 355/75 X
4,428,667  1/1984  Phelps et al. ..................... 355/75 X Primary Examiner—Donald A. Griffin
Attorney, Agent, or Firm—Jordan B. Bierman

[57] ABSTRACT

A document feeder installed on an electrophotographic copying machine, and this document feeder having transport rollers driven by a drive unit to carry a document sheet. The document feeder comprises a flexible sheet having holes, and being installed over a platen glass. The document feeder also comprises document transport rollers which come into contact with a document sheet on the platen glass through the holes in the flexible sheet in order to carry the document sheet on the platen glass.

5 Claims, 12 Drawing Sheets

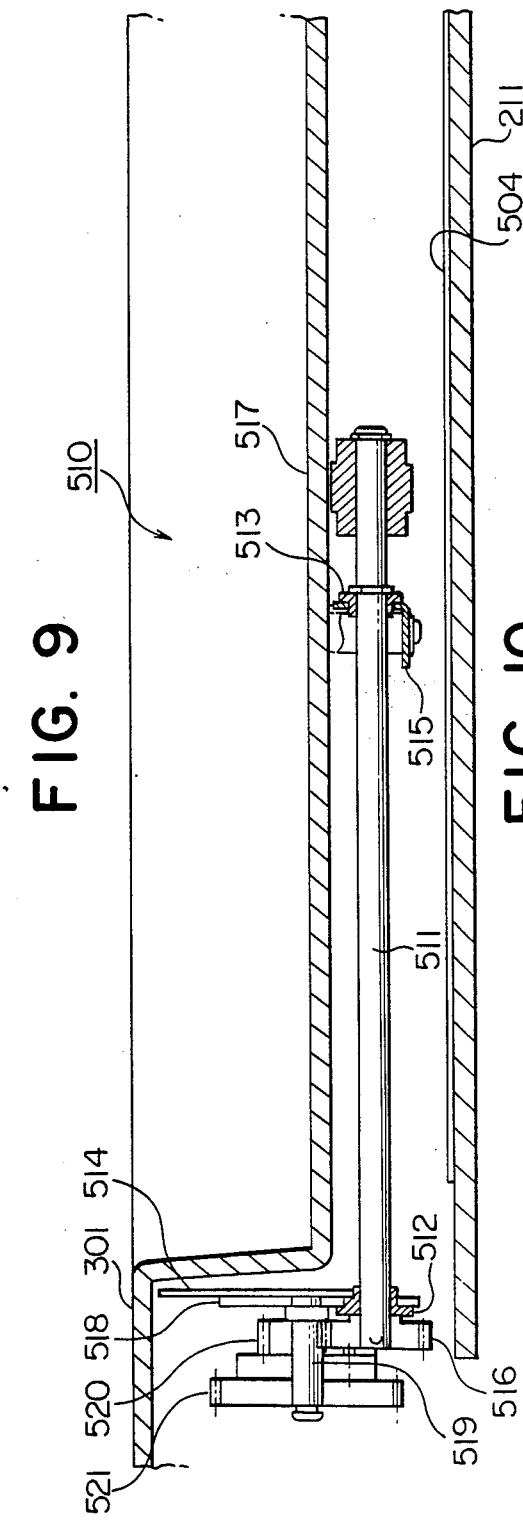
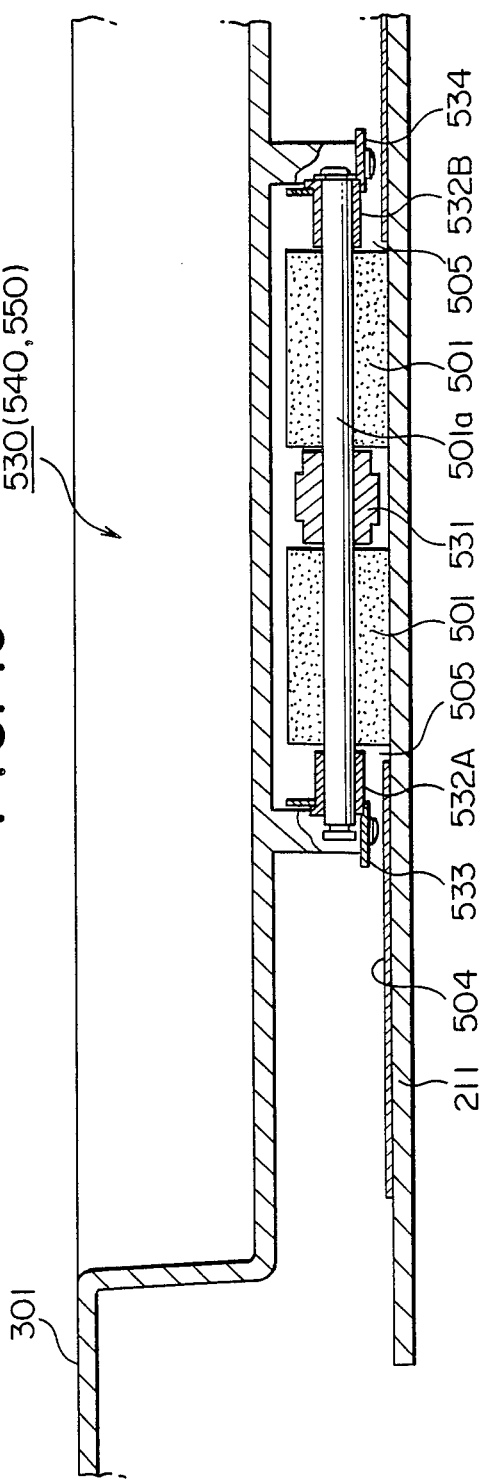

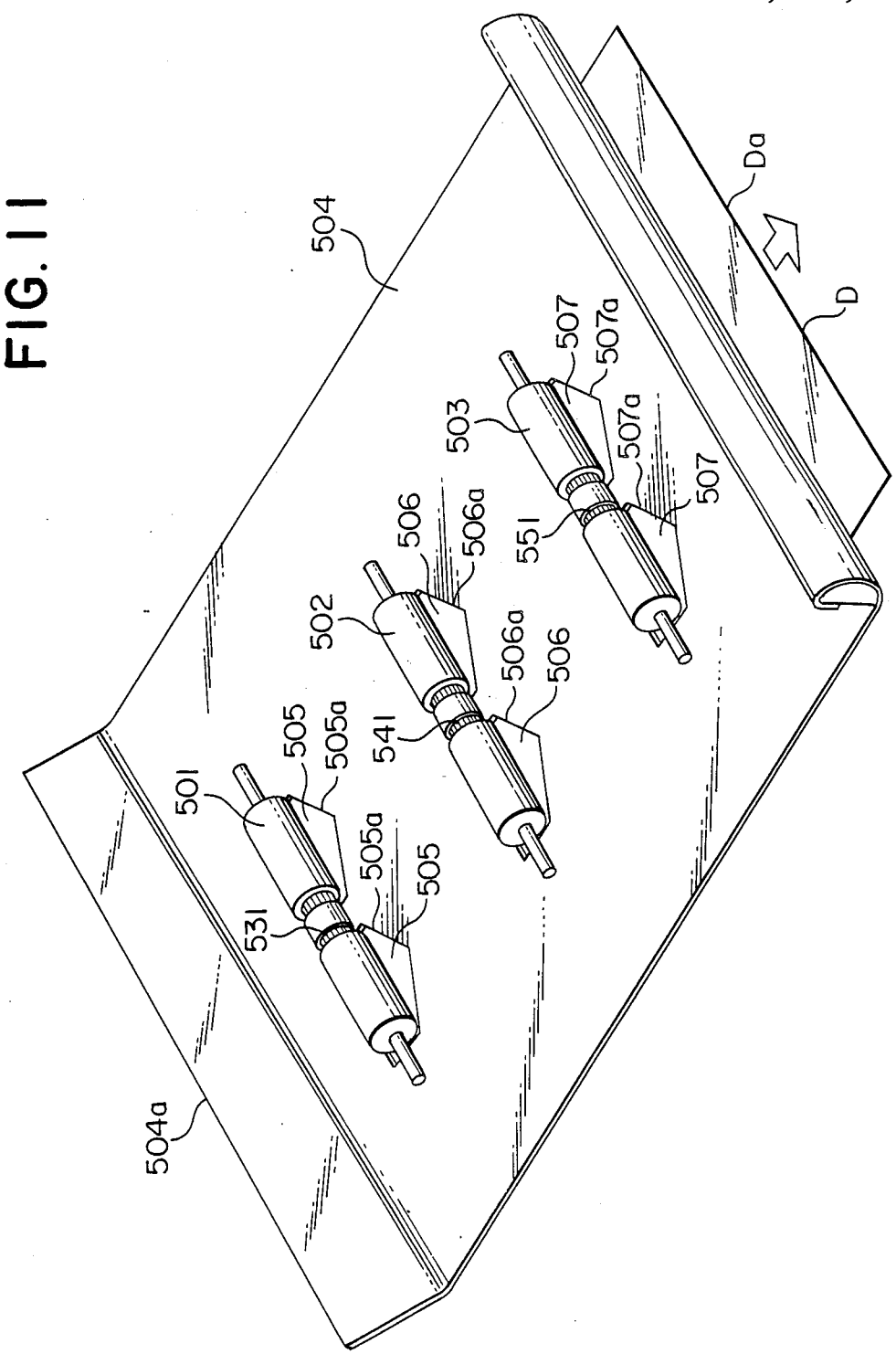

DOCUMENT FEEDER

FIELD OF THE INVENTION

The present invention relates to the improvement of a document feeder capable of automatically feeding a document onto a platen glass of a copying apparatus.

BACKGROUND OF THE INVENTION

Conventionally, this type of document feeder mounted on a platen glass of a copying apparatus has a transport section where a document is pressed on the surface of the platen glass by a white endless belt and is conveyed by the rotation of the belt. More specifically, in the transport section, the endless belt covers the whole surface of the platen glass to press a document on the glass, and is slightly loosened to produce the frictional force at the proper positions of the surface of the document, whereby the document is allowed to be fed. Accordingly, the conventional document feeder has the following problems;

(1) Since the thickness is required to be enough for rotation of the belt, the total height of the feeder becomes high, resulting in a large-sized apparatus.

(2) The pressing force of the belt is reduced gradually due to fatigue and deterioration and frequently causes problems due to a decrease in its elasticity, resulting in unsatisfactory serviceability.

(3) The belt rotates while sliding on the platen glass. This requires a large high-powered motor.

Therefore, the inventors of the present invention previously proposed a document feeder, which was mounted on a copying apparatus and had a white sheet over a platen glass. In that feeder, document transport rollers were in contact with the surface of the platen glass through holes formed at the proper positions on the sheet.

With that document feeder, in the transport portion, a document entered a gap between the white sheet and the surface of the platen glass to be pressed and conveyed. However, in the transport portion the surface of the sheet and a document come into contact with each other, thereby producing frictional force and static electricity. Accordingly, there was the possibility of causing such problems as preventing the document from being conveyed or becoming askew.

In consideration of the above problems, the object of the invention is to provide a document feeder having no possibility of causing problems due to friction and static electricity between the white sheet and a document.

SUMMARY OF THE INVENTION

This invention is related to a document feeder installed on an electrophotographic copying machine. The invented document feeder has transport rollers driven by a drive unit to carry a document sheet. The document feeder of the present invention comprises, (a) a flexible white sheet, having holes, and being installed over the surface of a platen glass:

(b) document transport rollers which come into contact with a document sheet on the platen glass through the holes in the above-mentioned flexible white sheet to carry the document sheet on the platen glass.

The document feeder of the invention further comprises means for controlling the tension of the flexible sheet. According to the means, the flexible white sheet is tightened and apart from the document sheet when the document sheet is carried onto the platen glass by the transport rollers, and the flexible white sheet is loosened and in contact with the document sheet when the document sheet is exposed to light.

According to one of the preferable embodiments, the color of the flexible white sheet can be a color which has a spectral reflection factor corresponding to spectral sensitivity of the photoreceptor.

To attain the above object, a document feeder of the invention, which is mounted on a copying apparatus, has a white sheet placed over the surface of a platen glass, wherein document transport rollers are in contact with the surface of the platen glass through holes formed at the proper positions on the sheet. In this feeder, at one end of the sheet a sheet tension control means is provided so as to prevent a document from being in contact with the white sheet when conveyed on the glass. In the case of exposing a document to light, the sheet tension control means loosens the sheet to allow the sheet to come into close contact with the surface of the document placed on the above glass. In the case of conveying a document, the sheet tension control means draws the sheet to allow the sheet to be separated from the surface of the glass.

The more detailed explanation of the present invention is described as follows.

The document feeder of this invention is equipped with a fixed white sheet over the surface of the platen glass installed in the copying machine. The document transport rollers come into contact with the platen glass through holes to carry the document. In other words, the document is carried by the rollers without using any endless belts. As a result, the height of the apparatus can be reduced, and the whole apparatus becomes compact.

The document transport rollers of this document feeder consist of plural groups of rollers in order to carry various sizes of documents on the platen glass, and driving power is transmitted to each roller from a motor.

The motor is installed in the vicinity of the members to fix the white sheet over the platen glass. Power generated by the motor is transmitted to the document transport rollers through gear trains, belts, pulleys, chains, sprockets and so forth. Those document transport rollers consist of plural lines of rollers and are installed lengthwise in the vicinity of the center line of the platen glass to the direction of document feeding.

In order to press these document transport rollers to the document sheet on the platen glass, the holes of the abovementioned white fixed sheet form holes with minimum size so as not to contact with the rollers. The shape of the holes is usually rectangular or polygonal.

If the holes of the white sheet overlap the margin of the document sheet which is set on the right position on the platen glass, the shade image of the peripheral sides of the hole appears on a recording paper after the document is exposed and processed for image forming.

The document sheet is carried by transport rollers and stopped at the right position by a stopper plate bumping against it. At that time, the stopping position is not so accurate that the margin of the document sheet sometimes overlaps the holes of the white sheet and the abovementioned shade image appears. Some methods such as using LED before developing process are carried out to erase the shade image, but it is difficult to erase it perfectly for some technical reasons.

The purpose of the present invention is to provide the document feeder having a white sheet with holes and document transport rollers, and the shade image of the holes in the white sheet and the transport rollers does not appear on a recording paper. At the same time, the apparatus can be made compact and maintenance of it is easy.

The exclusive features of the present invention are arranging the document transport rollers and making holes in the white sheet to meet the transport rollers so that the transport rollers press a document sheet and the position of the holes are set so as not to overlap the margin of the document sheet which stops at the right position on the platen glass to be exposed.

BRIEF DESCRIPTION OF THE DRAWINGS

FIG. 9 is a sectional view of the drive portion.

FIG. 10 is a sectional view of the transport rollers.

FIG. 11 is a perspective view of the fixed white sheet and transport rollers.

DETAILED DESCRIPTION OF THE PREFERRED EMBODIMENT

One example of the invention is described below by referring to the accompanying FIGS. 1, 2, 3a and 3b.

Figure 1:
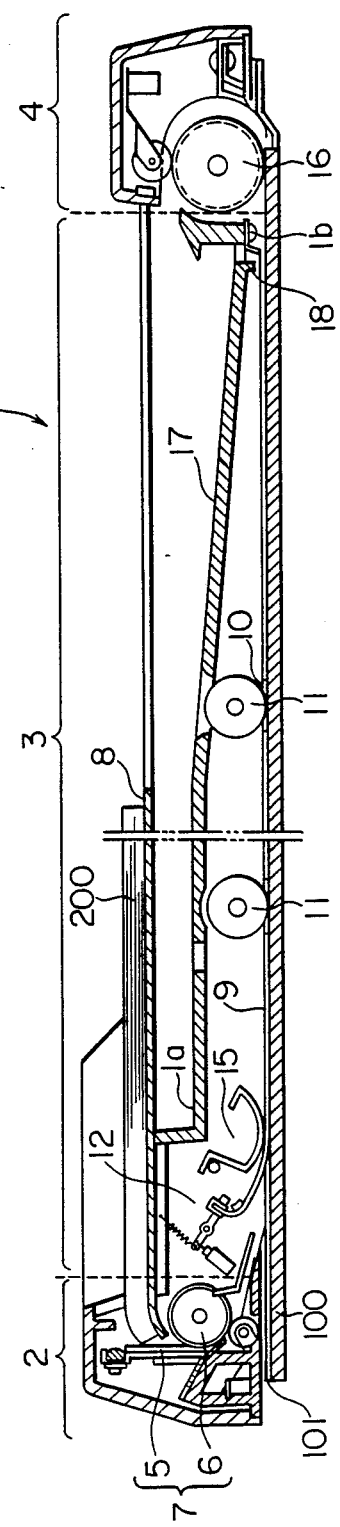
FIG. 1 is a sectional view illustrating a document feeder according to the present invention.
Figure 3A:
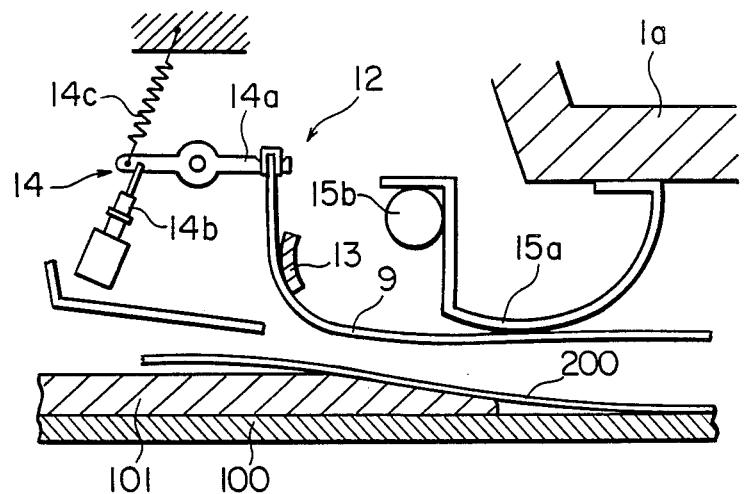
FIGS. 3a and 3b views each illustrating a white sheet tension control means, end portion of the white sheet and white sheet pressing means.
Figure 3B:
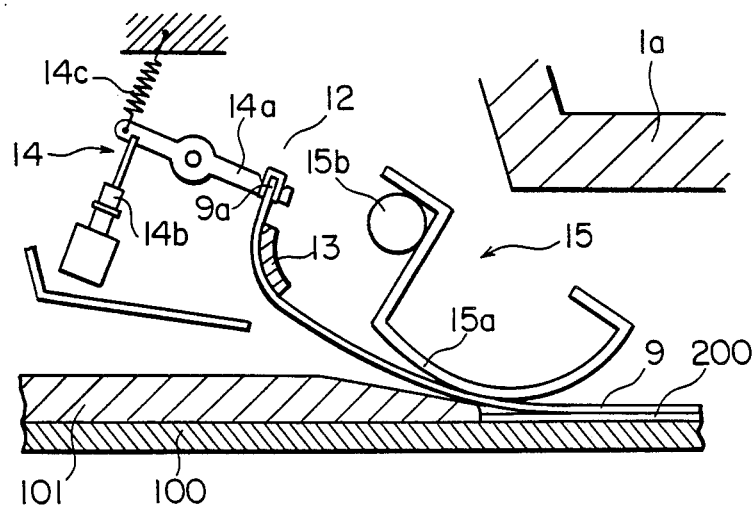

FIG. 1 is a sectional view of a document feeder according to the invention. FIGS. 3a and 3b are sectional views showing a sheet tension control means. In these figures, numeral 1 represents the document feeder of the invention, which is mounted on a platen glass 100 of an unshown copying apparatus and primarily comprises a document feed section 2, transport section 3 and document ejection section 4.

The document feed section 2 has a separation mechanism 7 comprising a document pressing strip 5 and document feed roller 6 so that documents 200 stacked on a document feed tray 8 can be separated one by one sequentially from the bottom document to be fed onto the above-mentioned platen glass 100. The platen glass 100 has one smooth portion of the top surface S so that a document 200 is allowed to slide on the top surface S. On the side of document feed section 2, the platen glass has another portion of the top surface, on which a stopper plate 101 is mounted.

Figure 2:
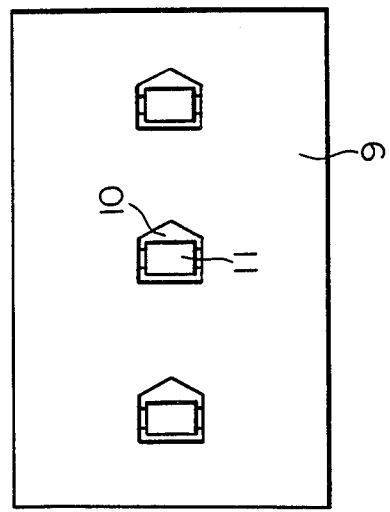
FIG. 2 is a plan view showing the positional relationship between document transport rollers and holes formed on a white sheet placed over a platen glass.

The transport section 3, which conveys a document 200 on the platen glass 100, has a white sheet 9 and document transport rollers 11 as main components. The white sheet 9, which is used to press a document 200 during exposure and made of lubricious plastic material such as a polyethylene telephthalate in the present invention, covers the whole of the top surface portion S. One end of the white sheet 9 on the side of the document feed section 2 is connected to a sheet tension control means 12 described later, and the other end on the side of the document ejection section 4 is connected to a fixed portion 1a of the document feeder 1. Further, as shown in FIG. 2, three holes are formed at the proper positions along the center line of the white sheet 9, so as to allow the document transport rollers to be protruded through the holes. Each hole is made to taper off in the feeding direction like a pentagon, so that its edges may not catch the leading edge of a document 200.

The document transport roller 11 is used to convey a document 200 on the platen glass 100. With this example, three document transport rollers 11 corresponding to the holes 10 formed on the back of the sheet 9 are provided so that they can, while rotating, press a document 200 through the holes 10 to feed the document 200 with the frictional force. The surface of each roller 11, which is covered with an elastic material capable of producing a high frictional force such as a rubber or plastic sponge, has one portion in contact with the surface S of the platen glass 100 through a hole 10. In addition, each document transport roller 11 is capable of forward and reverse rotation so as to finely adjust a document 200 to the final position in the case of exposure.

The sheet tension control means 12 provided to one end 9a of the above-mentioned white sheet 9 comprises a sheet surface guide 13 and a sheet drawing device 14. In the case of exposing a document 200 to light, the sheet tension control means allows the white sheet 9 to come into close contact with the platen glass 100 holding the document 200 between them so as to improve the condition of exposure. In the case of feeding a document 200 on the platen glass 100, it allows the white sheet 9 to rise above the glass 100 so as to smooth the document feeding. The sheet surface guide 13, which is used to regulate the sheet 9 to the location when raised up, is secured at a short distance from the end 9a of the sheet 9 on the side of the back of the sheet 9. The bottom end of the sheet surface guide 13 is located below the center of each document transport roller 11. The sheet surface guide 13 has the same width as that of the sheet 9 and has a smooth convex surface on the side in contact with the sheet 9 so that the white sheet 9 can be homogeneously drawn and be subjected to an even drawing force.

The sheet drawing device 14, which comprises a pivotal strip 14a is supported so as to rotate on a pivot located at its center, a solenoid 14b, and a spring 14c is arranged so as to draw or loosen the sheet 9 by turning ON and OFF the solenoid 14b, whereby the sheet is lifted or lowered. More specifically, one end of the pivotal strip 14a is connected to the end 9a of the sheet 9 on the side of document feed section 2 so as to draw the sheet 9. The other end of the pivotal strip 14a can be actuated in one direction by the solenoid 14b and in the other direction by the spring 14c.

Numeral 15 is a sheet pressing means comprising a pressing plate 15a and a motor 15b. The pressing plate 15a has the same width as that of the sheet 9 and is made of a gutter-shaped member having a smooth convex surface on the side in contact with the sheet 9, so that it can press the sheet 9 with a homogeneous force toward the stopper plate 101. The pressing plate 15a is capable of forward and reverse rotation. In the case of forward rotation, the pressing plate 15a presses the sheet 9 and closes the gap between the sheet 9 and the stopper plate 101, whereby it interferes with the stopper plate 101 to be stopped. In the case of reverse rotation, the end of the pressing plate 15a interferes with the fixed portion 1a of the main body 1 to be stopped. The motor 15b is integrally constituted together with an unshown torque limiter so as to maintain the state where in the case of forward or reverse rotation the pressing plate 15a is stopped by interfering with the stopper plate 101 or fixed portion 1b.

Numeral 16 is a document ejection roller, which is provided to the document ejection section 4 of the main body 1 so as to eject a document 200 onto a document ejection tray 17. Numeral 18 is a fixed projection, which is provided at the ejection side end on the bottom surface of the document ejection tray 17.

The operation of the document feeder according to the invention is described below.

First, documents 200 are stacked on a stacker 8 attached onto the top of the main body 1 of the document feeder, wherein one end portion of the document 200 is set in the separation mechanism 7 of the document feed section 2. Then, the documents 200 are separated and fed to the transport section 3 one by one sequentially from the bottom sheet by the pressing force of the document pressing strip 5 and the frictional force of the document feed roller 6.

The document 200 is fed to the gap between the platen glass 100 of the copying apparatus and the white sheet 9 in the transport section 3, and is conveyed with the document transport rollers 11 protruded through the holes 10 of the white sheet 9. In the case of conveying the document 200, the solenoid 14b of the drawing device 14 is turned ON to allow the pivotal strip 14a to draw the sheet 9. Accordingly, the document 200 conveyed on the platen glass 100 never comes into contact with the white sheet 9. In the case of exposing the document 200 to light, the document 200 is fed back in the reverse direction and interferes with the stopper plate 101 to be stopped. In this case, the pressing strip 15a is rotated by the motor 15b of the pressing device 15 to press the sheet 9, thereby closing the gap between the sheet 9 and the stopper plate 101. Therefore, there is no possibility of the document 200 going over the stopper plate 101 back to the document feed section 2. In addition, the solenoid 14b is turned OFF to reverse the pivotal strip 14a, whereby the sheet 9 is slightly loosened to press the document 200 on the surface S of the platen glass 100 because of its own weight. After the completion of exposure, the document 200 is ejected through the document ejection roller 16 of the document ejection section 4 and stacked in order on the ejection tray 17.

As mentioned above, the characteristics of the document feeder of the invention is as follows: a white sheet over a platen glass is placed in the main body of the feeder mounted on a copying apparatus; document transport rollers are in contact with the surface of the platen glass through holes formed at the proper position on the sheet; and a sheet drawing force control means is provided so that the sheet can come into close contact with the glass in the case of exposing a document to light and can be lifted from the glass 100 in the case of conveying a document on the glass. Therefore, when exposed to light, a document is allowed to come into close contact with the surface of the platen glass, resulting in optimization of the condition of copying. When conveyed on the glass, a document never comes in contact with the white sheet. As a result, some remarkable effects are obtained. For example, a higher quality of a duplicate image can be formed from a document. Further, a document can be prevented from skewing due to the frictional force and static electricity between the document and the white sheet.

Figure 4A:
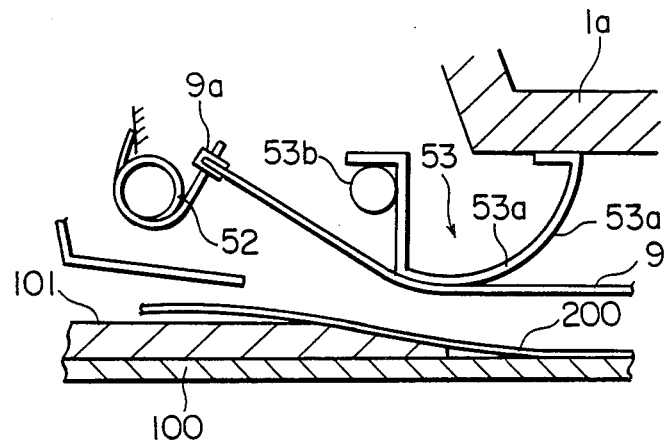
FIGS. 4a and 4b are sectional views showing another design of the white sheet tension control means.
Figure 4B:
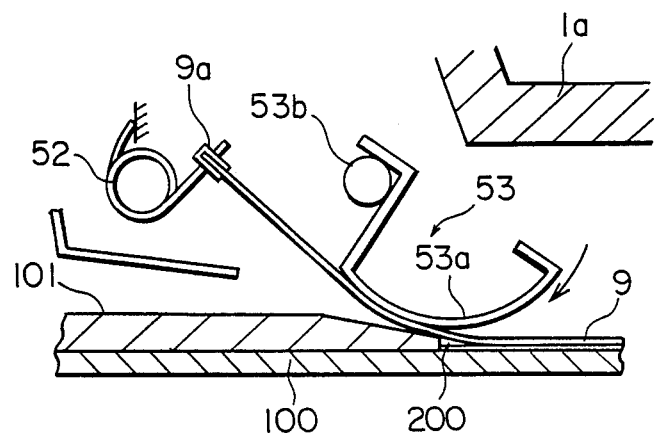

Another example of the present invention is described below by referring to FIGS. 1, 2, 4a and 4b. FIGS. 4a and 4b are sectional views illustrating a sheet end portion and a sheet pressing means.

Figure 5:
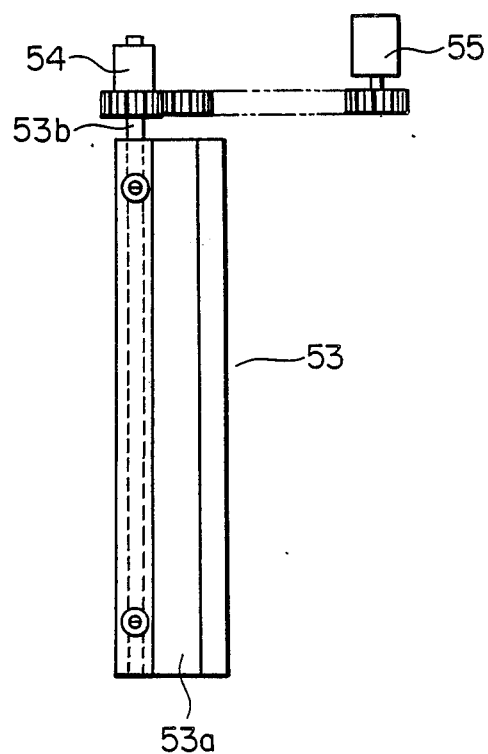
FIG. 5 is a top view illustrating a pressing plate and its drive system.

As shown in FIG. 4a and 4b, a torsion coil spring 52 is attached onto the end portion 9a of the white sheet 9. In the case of exposing a document to light, the torsion coil spring 52 allows the white sheet 9 to come into close contact with the platen glass 100 so as to optimize the condition of exposure. In the case of conveying a document on the glass 100, it allows the white sheet 9 to be lifted from the glass 100 so as to smooth the document feeding. The torsion coil spring 52 is arranged to draw and lift the sheet above the platen glass 100 so far as the sheet is not subjected to the pressing force. Numeral 53 is a pressing means comprising a pressing plate 53a and a pressing plate drive shaft 53b, both of which are shown in FIGS. 4a, 4b and 5. The pressing plate 53a has the same width as that of the sheet 9 so as to press the sheet with a homogeneous force toward the stopper plate 101. Further, the pressing plate 53a is made of a gutter-shaped member having a smooth convex surface on the side in contact with the sheet 9. Numeral 54 is a torque limiter, which is used to maintain the state where the pressing plate 53a has interfered with the stopper plate 101 or the fixed portion 1a, and further to prevent the pressing plate 53a from being subjected to an overload. The torque limiter 54 is located at the proper position (at the end of a gear on the drive shaft 53b) on a driving force transmission system connecting the pressing plate drive shaft 53b and a motor 55.

Numeral 16 is an ejection roller, which is placed at the ejection section 4 of the document feeder 1 so as to eject a document 200 onto an ejection tray 17. Numeral 18 is a fixed projection, which is provided to the ejection portion side end on the bottom surface of the ejection tray 17 so as to regulate the position where the white sheet 9 is drawn and lifted. These are shown in FIGS. 1, 2, 4a, 4b and 5.

The operation of a document feeder according to this example is described below.

First, documents 200 are stacked on the feed tray 8 attached to the top of the document feeder, wherein one end portion of the document 200 is set in the separation mechanism 7 of the feed section 2. In this section, the documents 200 are separated and fed to the transport section 3 one by one from the bottom sheet by the pressing force of the document pressing strip 5 and the frictional force of the feed roller 6.

The document 200 is fed to the gap between the platen glass of a copying apparatus and the white sheet 9 in the transport section 3, and is conveyed by the document transport rollers 11 protruded through the holes of the white sheet 9. In the case of conveying the document 200 on the glass 100, the pressing plate drive shaft 53b and motor 55 are rotated forward, whereby the pressing plate 53a interferes with the fixed portion 1a of the document feeder 1. This allows the white sheet 9 to be lifted above the platen glass 100 by the torsion coil spring 52 drawing the end portion 9a of the sheet 9. Therefore, the document 200 is never in contact with the white sheet 9. On the other hand, in the case of exposure, the document 200 is fed back to the feed section side and interferes with the stopper plate 101 to be stopped. In this case, the pressing plate drive shaft 53b and the motor 55 are reversed, whereby the pressing plate 53a presses the white sheet 9 to close the gap between the white sheet 9 and the stopper plate 101. This prevents the document 200 from going over the stopper plate 101 back to the side of the feed section 2. Further, the document 200 is pressed closely on the platen glass 100 by the white sheet 9, thereby realizing a satisfactory condition of exposure. In addition, while the pressing plate 53a is pushing against the fixed portion 1a of the document feeder or the stopper plate 101, the torque limiter 54 limits the torque load to a certain extent. After the completion of exposure, the document 200 is ejected by the ejection roller 16 of the ejection section 4 to be stacked in order on the ejection tray 17.

As mentioned above, the document feeder of the invention is characterized in that a white sheet over a platen glass is provided in the document feeder mounted on a copying apparatus, wherein document transport rollers are in contact with the surface of the platen glass through holes formed at the proper positions of the white sheet. Accordingly, a document is conveyed without using an endless belt. This allows saving a space required for the rotation of the endless belt, thereby remarkably reducing the thickness of the document feeder. Further, the white sheet can be easily handled by imposing and canceling a drawing force, and unlike the endless belt it does not need to rotate while turning. Thus, the white sheet is hardly fatigued or deteriorated. In addition, unlike a conventional feeder the document feeder of the invention does not need an endless belt to rotate against the friction with the platen glass. Thus, the use of a small-sized motor is allowed. These effects have resulted in a thinner and more serviceable document feeder.

EXAMPLE

Another example of the present invention is described below by referring to the accompanying drawings.

Figure 6:
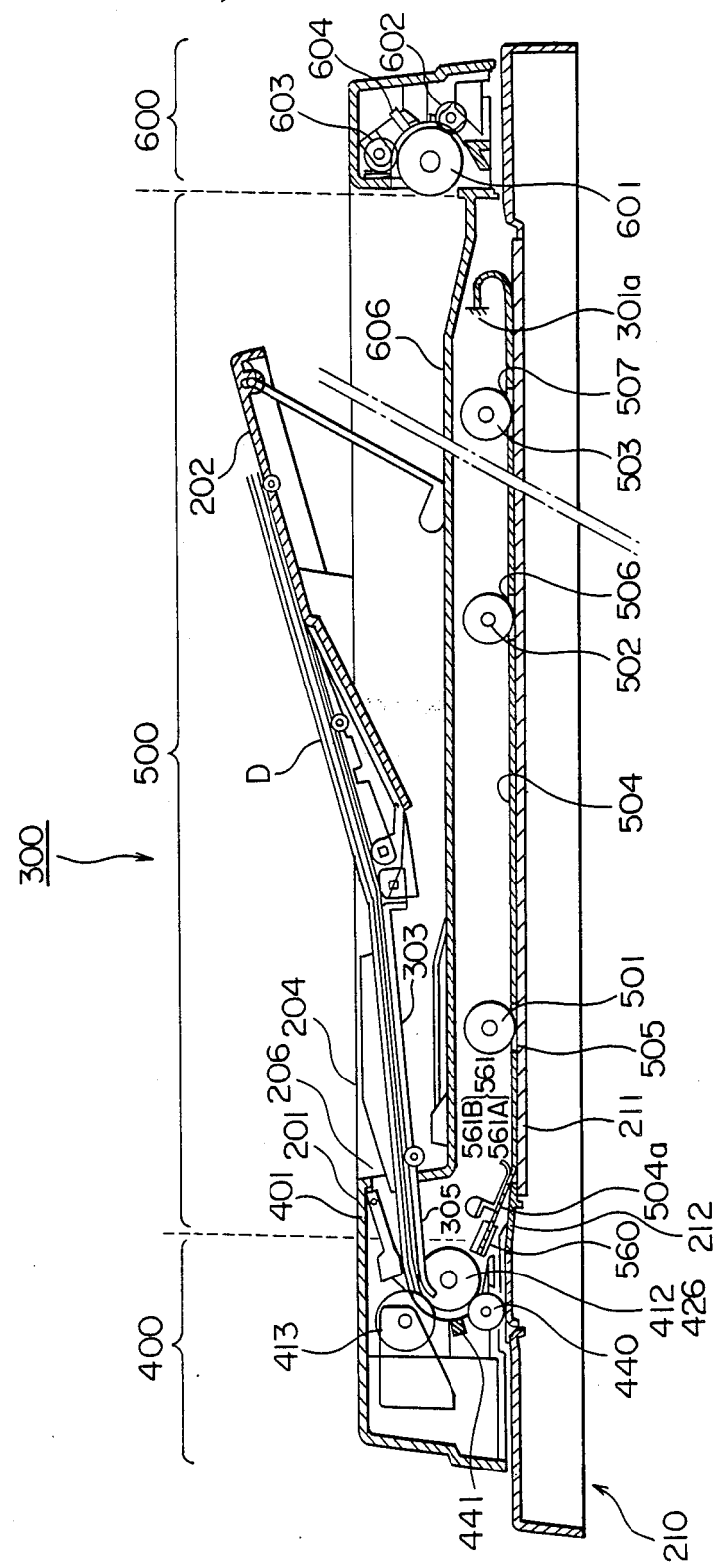
FIG. 6 is a sectional view illustrating one of the embodiments of a document feeder according to the present invention.
Figure 7:
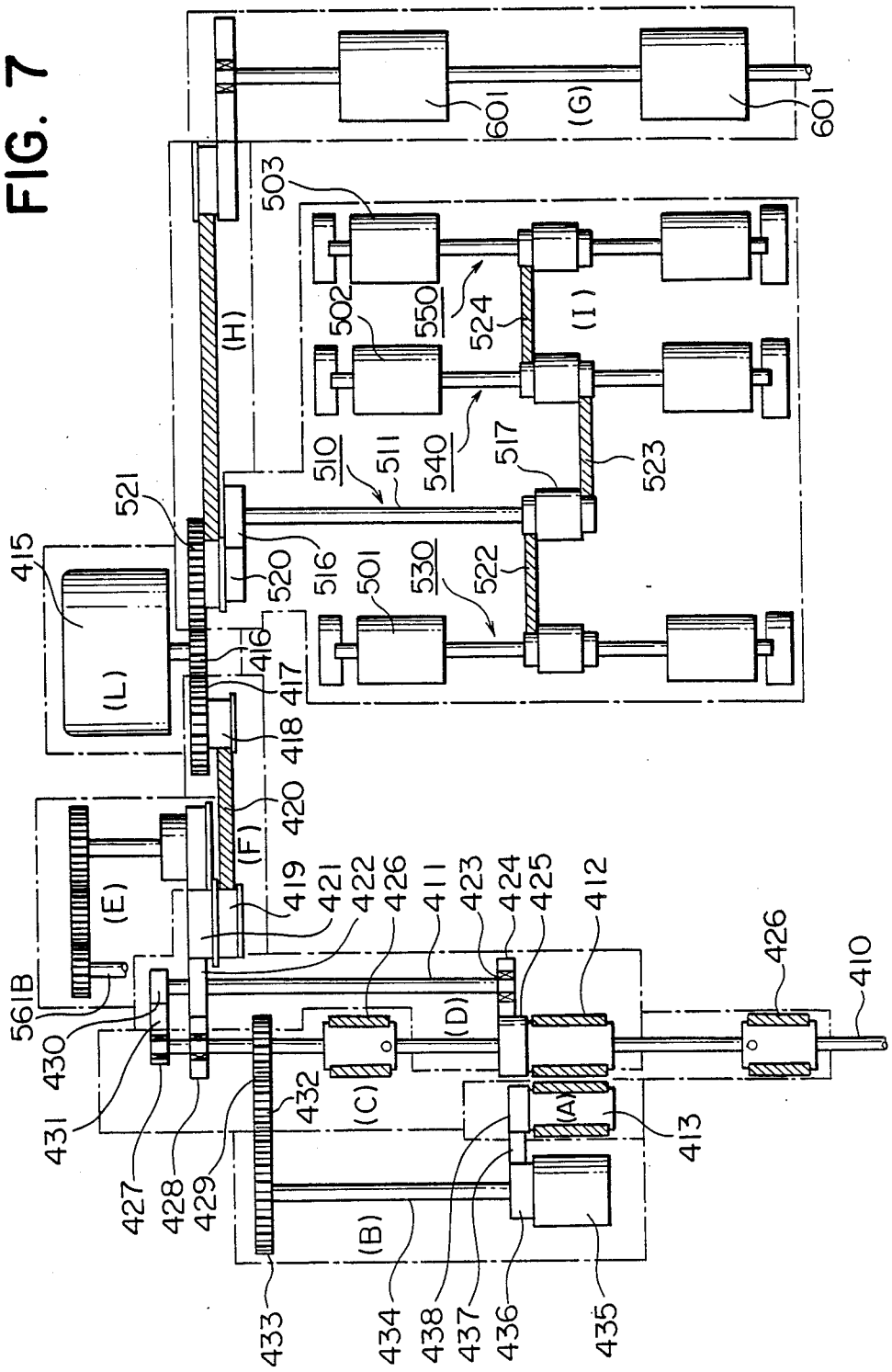
FIG. 7 is the drive system diagram of this document feeder.
Figure 8:
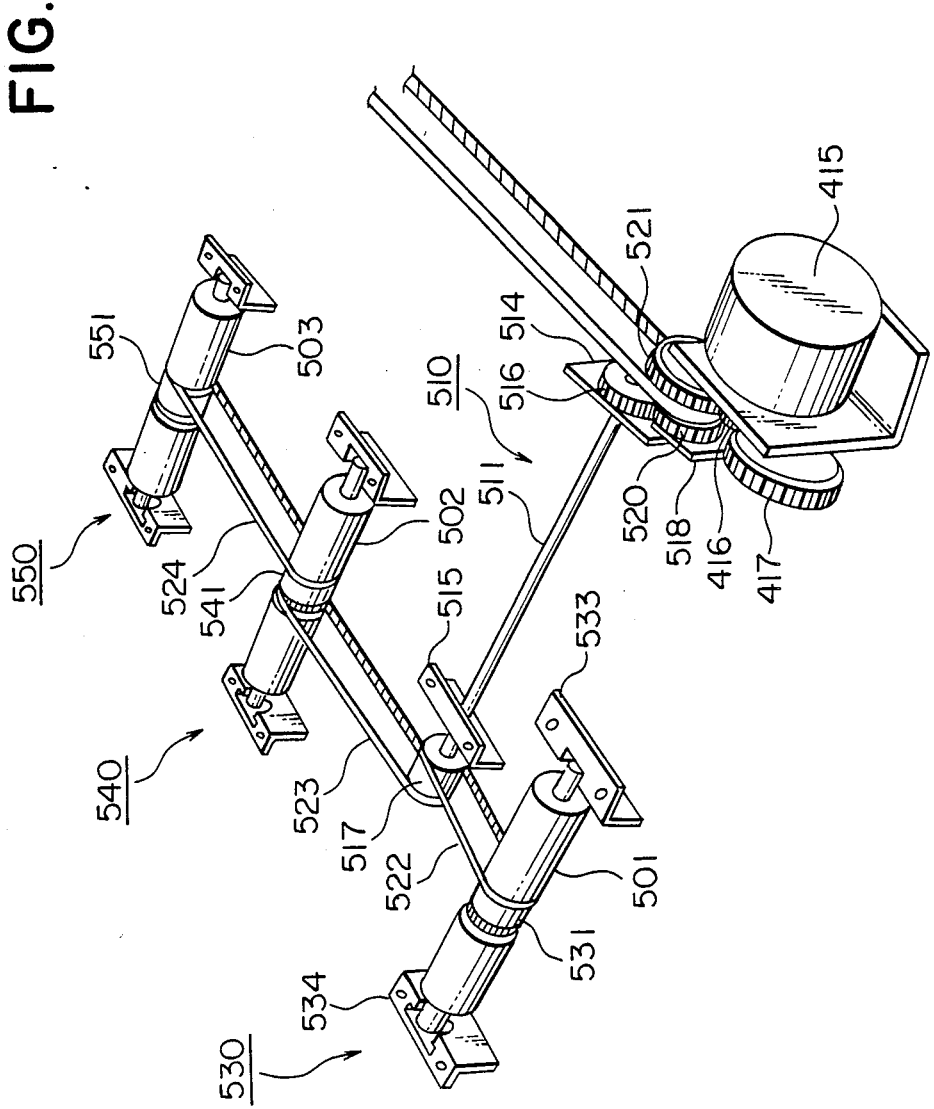
FIG. 8 is a perspective view of the document transport portion.

FIG. 6 is a sectional view of a document feeder according to the invention. FIG. 7 is a schematic drawing showing the drive system for the entire document feeder. FIG. 8 is a plan view showing the drive system of transport rollers. FIG. 9 is a perspective side view of a transport section.

In these figures, numeral 210 is a copying apparatus, numeral 211 a platen glass, and numeral 212 a stopper plate for the trailing edge of a document. A document feeder 300 is mounted on the above platen glass 211. The document feeder 300 is pivotally attached to the hinge portion on the top of the copying apparatus 210 so as to be allowed to be lifted from the top surface of the platen glass 211. The above document feeder 300 primarily comprises a document feed section 400, transport section 500 and document ejection section 600.

On the top portion of the document feeder 300 is attached a document feed tray which comprises a movable feed tray 302 capable of being folded and a stationary feed tray 303 secured to a housing 301. Both trays are inclined upward. Documents D are allowed to be loaded on the document feed tray, wherein the leading edge of the documents are inserted into the document feed section 400. Further, onto the above stationary feed tray 303 is attached a sheet width regulating plate 304 movable in the widthwise direction, so as to regulate the width of documents to be set on the tray.

Almost at the center of the downstream side of the above stationary feed tray 303 on the side downstream relative to the feeding direction is formed a concave notch, in which a movable guide plate is attached, whereby the movable guide plate 305 is allowed to pivotally move up and down from the top surface of the stationary feed tray 303. The movable guide plate 305 is connected to an unshown solenoid.

On the other hand, above the movable guide plate 305 lies a feed lever 401 pivotally supported. More specifically, the pivot portion at one end of the feed lever 401 is pivotally supported above a document feed in-let 306 of the housing 301. The other end of the feed lever 401 is lowered because of the weight of the feed lever 401 to press the top surface of the documents D. In the case of feeding a document, the above previously-mentioned guide plate 305 is raised and located slightly above the peripheral surface of a feed roller 412. In this condition, when a set of documents D are set on the movable feed tray 302 and stationary feed tray 303 and pushed in the document feeding direction, the leading edge of the set of the documents D is pushed out along the top surface of the above movable guide plate 305. At the same time, the leading edge of the set of documents D push up the bottom of the feed lever 401 that is supported from above and lowered owing to its weight, and then the set of documents D are stopped when they come into contact with both the peripheral surface of a double-feeding preventing roller 413 and a rib of the housing 301. FIG. 6 is a sectional view showing the condition where the documents D are set as mentioned above.

When the previously-mentioned solenoid is turned ON by a document feed start signal, the movable guide plate 305 is pivotally moved, whereby one end portion thereof is lowered and located below the top surface of the previously-mentioned stationary feed tray 303.

The document feed section 400, which is disposed downstream of the previously-mentioned document feed tray relative to the document feed direction in the left portion of the document feeder 300 in FIG. 6, has a feed means (first document feed means) for separating a set of documents D inserted from the document feed tray to feed them one by one sequentially from the bottom document, and a second document feed means for feeding one document D separated from the other onto the platen glass 211 of the copying apparatus 210.

The above feed means comprises a feed roller 412 (first document feed roller) rotatably set on the center of a first drive shaft 410 and driven by a second drive shaft 411, and a double-feeding preventing roller 413 supported through its axle on a double-feeding preventing roller mounting plate 414 disposed above the feed roller 412 off to the left in the figure.

FIG. 7 is a schematic drawing which shows the drive system of the entire document feeder. The drive shaft of the main motor 415 rotates the above-mentioned second drive shaft 411 through gears 416 and 417, then through timing pulleys 418, 419 and timing belt 420, further through a gear 421 having the same axle that the timing pulley 419 has, and further through a gear 422 constructed integrally with the second drive shaft 411. The second drive shaft 411 has, at one end thereof, a gear 424 incorporating a one-way clutch 423. The gear 424 is engaged with a gear 425 constructed integrally with the feed roller 412 set on the previously-mentioned first drive shaft 410. More specifically, whether the main motor 415 rotates forward or reversely, a torque is transmitted from the second drive shaft 411 to the feed roller 412 rotatably set on the first drive shaft 410 only in the case of reverse rotation of the main motor 415. In the case of forward rotation of the main motor 415, the feed roller 412 freely rotates without having a torque transmitted.

On the other hand, on the first drive shaft 410, second document feed rollers 426 are supported at both sides of the above feed roller 412 so as to rotate integrally with the first drive shaft 410.

In the neighborhood of one end of the above first drive shaft 410 are attached two gears 427 and 428 each incorporating a one-way clutch, as well as a gear 429 secured on the first drive shaft 410.

On the other hand, on the end of the previously-mentioned second drive shaft 411 is secured a gear 430, which is, via an idler gear 431, engaged with the gear 427 attached near the end of the above first drive shaft 410.

The above arrangements allow the first drive shaft 410 and the second document feed rollers 426 constructed integrally with the first drive shaft 410 to always rotate only in the document feed direction in spite of the forward or reverse rotation of the main motor 415.

The gear 429 secured on the above first drive shaft 410 transmits torque via an idler gear 432 to a third drive shaft 434 (torque limiter shaft) having a gear 433 secured on one end thereof. On the other end of the third drive shaft 434 is set a gear 436 equipped with a torque limiter 435. The gear 436 is engaged via an idler gear 437 with a gear 438 constructed integrally with the previously-mentioned double-feeding preventing roller 413. The double-feeding preventing roller 413 presses the previously-mentioned feed roller 412 with a fixed pressure to form a nipping portion.

As mentioned previously, the first drive shaft 410 rotates only in one direction in spite of the forward and reverse rotation of the main motor 415. Accordingly, the double-feeding preventing roller 413 connected via the gears to the first drive shaft 410 is capable of unidirectional rotation.

During the time when the above feed roller 412 and double-feeding preventing roller 413 are feeding a document, the second document feed rollers 426 secured on the first drive shaft 410 rotatably supporting the feed roller 412 rotate in the same direction at the same velocity as the feed roller 412, whereby they play an auxiliary part in feeding the document while making it U-turn.

The second document feed means in the document feed section 400 comprises the two second document feed rollers 426 secured on both sides of the previously-mentioned feed roller 412 rotatably set on the first drive shaft 410, and a roller 440 driven by the rollers 426, which is pressed on the bottom sides of the rollers 426 to rotate following the rotations of the rollers 426.

The second document feed rollers 426 individually have a diameter slightly larger than that of the feed roller 412, and are allowed to be driven independent of the feed roller 412. Further, when the feed roller 412 rotates, the second document feed rollers 426 rotate in the same direction as the feed roller 412, so as not to prevent the feed of a document D.

On the transport path downstream of the nipping position between the above feed roller 412 and double-feeding preventing roller 413 relative to the document feeding direction, a document detecting sensor 441 is provided in the neighborhood of the position where the previously-mentioned roller 440 driven by the rollers 426 presses the rollers 426. The document detecting sensor 441 is turned ON when the leading edge of one document separated from the other of the previously-mentioned set of documents at the nipping position passes the sensor, and is turned OFF when the trailing edge of the document D passes the sensor.

When a fixed time has passed after the above document detecting sensor 441 detects the leading edge of a document, a signal indicating the detection is produced. When a fixed time has passed after that, the solenoid is turned ON to activate each member for linkage, whereby the movable guide plate 305 is lowered.

At the same time, the main motor 410 shifts from reverse rotation to forward rotation. In this case, however, the first drive shaft 410 continues to rotate in the same direction as before, via the gear 430 of the second drive shaft 411, idler gear 432, and gear 427 incorporating a one-way clutch (provided that rotation is not transmitted to the previously-mentioned gear 428 incorporating a one-way clutch). The second transport rollers 426 secured on the above shaft 410 also continue to rotate in the same direction as before.

On the other hand, the second drive shaft 411 shifts from reverse rotation to forward rotation as the main motor 415 shifts to the forward rotation. However, the gear 424 is freely rotated by the one-way clutch 423 provided to one end of the second drive shaft 411, whereby the rotation of the second drive shaft is not transmitted to either the gear 425 engaged with the gear 424 or the feed roller 512 constructed integrally with the gear 425.

When the leading edge of the document D is nipped between the previously-mentioned document feed rollers 426 and the follower roller 440, the document D, which is tightly fitted around both the freely-rotating feed roller 412 and the forward-rotating second document feed roller 426, drives and rotates the feed roller 412 in the document feed direction.

In this case, the double-feeding preventing roller 413 continues to rotate forward because the first drive shaft 410 continues its forward rotation, thereby feeding back the next documents and preventing the double-feeding of documents. Additionally, the second document feed rollers 426 continue their rotations, whereby one document D separated from the other continues to be fed into the transport section 500.

The transport section 500, which conveys a document D on the platen glass 211, has a stationary white sheet member 504, and document transport rollers 501, 502 and 503 as main components. The stationary white sheet member 504 (hereinafter referred to as a sheet member), which is used to press a document D during exposure and made of lubricous plastic material such as a polyethylene telephthalate (PET) in present invention, covers the entire top surface of the platen glass. One end of the sheet member 504 on the side of the document feed section 400 is connected to a torsion coil spring, and the other end on the side of the document ejection section 600 is connected to a fixed portion 301a of the housing 301. Further, holes 505, 506 and 507 are formed at the proper positions along the center line of the sheet member 504, so as to allow the document transport rollers 501, 502 and 503 to be protruded through the holes.

The document transport rollers 501, 502 and 503 are used to convey a document D on the platen glass 211. They correspond to the holes 505, 506 and 507 formed on the back of the sheet member 504 so that they can, while rotating, press a document D through the holes and feed the document D with the frictional force. Each surface of the rollers 501, 502 and 503, which is covered with an elastic material capable of producing a high frictional force such as a rubber or plastic sponge, has one end portion in contact with the surface of the platen glass 211. In addition, the document transport rollers 501, 502 and 503 are each capable of forward and reverse rotation so as to finely adjust a document D to the final position in the case of exposure.

As shown in FIG. 6, the left end portion 504a of the previously-mentioned sheet member 504 is held by a holding member 560, which is connected to an unshown torsion coil spring. In the case of exposing a document to light, the torsion coil spring allows the sheet member 504 to come into close contact with the platen glass 211 so as to optimize the condition of exposure. In the case of conveying a document on the glass 211, it allows the sheet member 504 to be lifted from the platen glass 211 so as to smooth the document feeding. So, the torsion coil spring is arranged so as to draw and lift the sheet member 504 as far as the sheet member 504 is not subjected to the pressing force. Numeral 561 is a pressing means, which comprises a pressing plate 561A (swing-back plate) and a pressing plate drive shaft 561B. The pressing plate 561A has the same width that the sheet member 504 has, so as to press the sheet member 504 with a homogeneous force toward the stopper plate 212. Further, the pressing plate 561A is made of an elastic member having a convex surface on the side in contact with the sheet member 504.

One end of the pressing plate drive shaft 561B is connected to the main motor 415 via a gear train, whereby a torque is transmitted to the pressing plate drive shaft 561B. (See the swing-back plate portion E shown in FIG. 7.) To the end of the above pressing plate drive shaft 561B is provided a torque limiter, which is used to maintain the condition where the pressing plate 561A has interfered with the stopper plate 212, and further to prevent the pressing plate 561A from being subjected to an overload.

FIG. 8 is a perspective side view of the sheet member 504 as taken out from the transport section and seen from the side of the platen glass 211.

The previously-mentioned main motor 415 drives both the previously-mentioned document feed section 400 and the transport section 500 at the same time. More specifically, the gear 416 constructed integrally with the motor shaft of the main motor 415 is connected to a transport section drive unit 510 via a gear train to rotate a drive shaft 511 (station shaft). FIG. 9 is a sectional view of the above transport section drive unit 510.

The above drive shaft 511 is rotatably supported by bearings 512 and 513 attached near both ends thereof and mounting plates 514 and 515 having the bearings 512 and 513 fixed therein. Further, a gear 516 is secured on one end of the drive shaft 511, and a timing pulley 517 on the other end. The gear 516 is engaged with a gear 520 having a smaller diameter, which is rotatably supported on a idler shaft 519 secured on a mounting plate 518. The gear 520 with a smaller diameter is constructed integrally with a gear having a larger diameter, which is engaged with the gear 516 constructed integrally with the drive shaft of the previously-mentioned main motor 415.

The above arrangements allow the main motor 415 to transmit its drive torque to the drive shaft 511, thereby rotating the drive shaft 511.

The timing pulley 517 secured on the end of the drive shaft 511 has two toothed-pulley portions on both ends thereof. These toothed-pulley portions can rotate timing belts 522 and 523 engagedly laid around the toothed-pulley portions.

Upstream of the above transport section driving unit 510 relative to the document feeding direction, a first transport roller portion 530 is disposed via a timing belt 522. Downstream of the transport section driving unit 510, a second transport roller portion 540 is disposed via a timing belt 523. Further downstream of the driving unit 510, a third transport roller portion 550 is disposed via a timing belt 524.

FIG. 10 is a sectional view of the first transport roller portion 530. Each of the above transport roller portions 530, 540 and 550 comprises the same members. Therefore, the first transport roller portion 530 is described below as being representative.

On the center portion of a revolving shaft 501a constructed integrally with the document transport roller 501 is secured a timing pulley 531. On both ends of the revolving shaft 501a are set bearings 532A and 532B made of sintered metal containing iron and copper.

The bearings 532A and 532B are set in lengthwise holes formed on transport roller mounting plates 533 and 534, and locked in notch portions. The revolving shaft 501a of the above document transport roller 501 is set in the above mounting plate 533 and 534 together with the bearings 532A and 532B. Both ends of the revolving shaft 501a are drawn by springs so as to allow the peripheral surface of the document transport roller 501 to press the surface of the platen glass 211.

The first transport roller portion 530 constituted as mentioned above presses the platen glass 211. At the same time a drive torque is transmitted to the portion 530 by the timing belt 522 engagedly laid around the timing pulleys 517 and 531.

A document transport roller 502 of the second transport roller portion 540 is also drawn by springs like the first transport roller portion 530. At the same time, a drive torque is transmitted to the portion 540 by a timing pulley 541 rotated following the rotation of the timing belt 523.

A document transport roller 503 of the third transport roller portion 550 is rotated integrally with a timing pulley 551 subjected to a drive torque transmitted from the timing pulley 541 and timing belt 524. This transport roller 503 is drawn by springs in the same way as previously mentioned, so as to press the platen glass 211.

Figure 12:
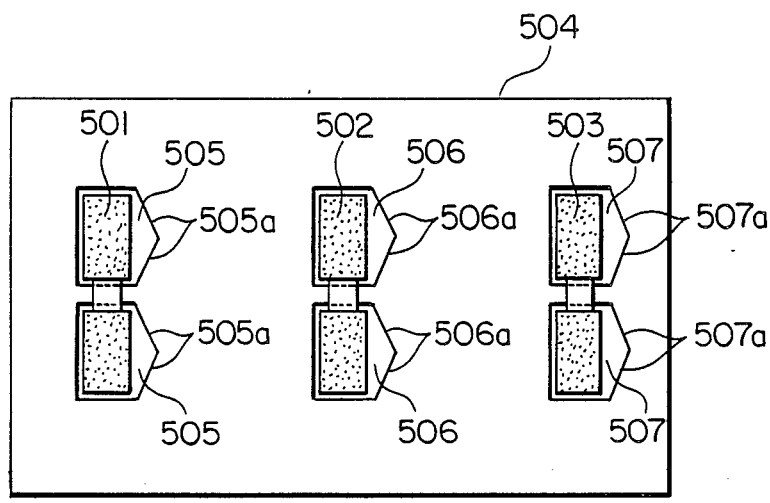
FIG. 12 is a top plan view of the fixed white sheet and the document transport rollers.
Figure 13:
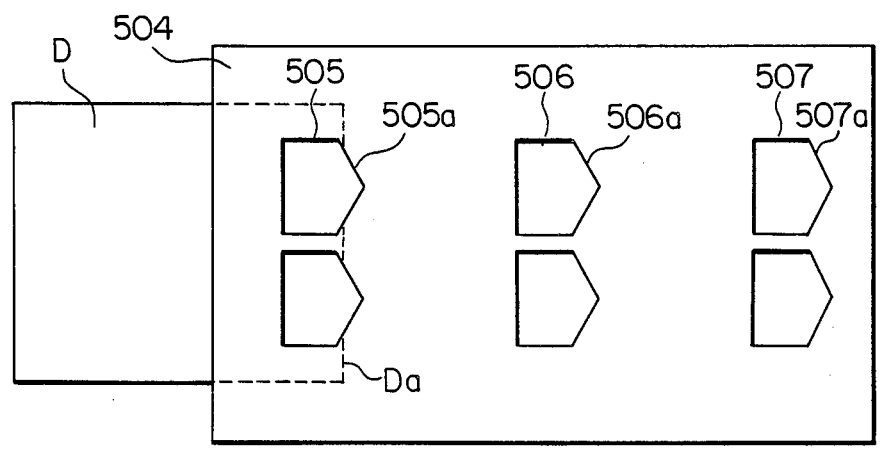
FIG. 13 is a top plan view to illustrate how a document sheet is carried by the transport rollers.

FIG. 11 is a perspective side view illustrating the sheet member 504 and the document transport rollers 501, 502 and 503, and FIG. 12 is a plan view of them. FIG. 13 is a plan view illustrating the condition where a document is fed on the sheet member 504.

As shown in these figures, at the proper positions on the sheet member 504 are formed the holes 505, 506 and 507, so as to allow the previously-mentioned document transport rollers 501, 502 and 503 to press the platen glass through the holes. As mentioned previously, each of the transport rollers 501, 502 and 503 includes two elastic rollers on its revolving shaft. Accordingly, each of the above holes 505, 506 and 507 correspondingly includes two openings that correspond to the transport rollers 501, 502 and 503, i.e. six openings in are totally formed.

The above holes 505, 506 and 507 are made pentagonal so that their edges 505a, 506a and 507a on the downstream side relative to the document feed direction correspondingly make two inclinations to the axes of the previously-mentioned document transport rollers 501, 502 and 503 and taper off in the document feed direction.

The above hole 505, 506 and 507 are each located so as to maintain the area required to effectively press a document D. At the same time, they are located so that when exposed to light on the platen glass 211, the peripheral sides of a document D of each size (B5 size to A3 size) may not be caught in the holes thereby producing a shadow image. The edges 505a, 506a and 507a of the holes are arranged so as to minimize the openings of the holes.

As mentioned in FIG. 13, when passing the above hole edges 505a, the leading edge Da of a document D relative to the feed direction, owing to the inclinations of the hole edges 505a, is allowed to smoothly move along the inclined sides without interfering with the hole edges. This prevents the document D from being folded or wrinkled, or from being disadvantageously fed. This also prevents the hole edges 505a from being damaged. The edges 506a of the holes 506 in the neighborhood of the second transport roller 502 each have two inclinations similar to above, thereby producing the same effect as above. It is the same with the edges 507a of the holes 507 in the neighborhood of the third transport roller 503.

Figure 14:
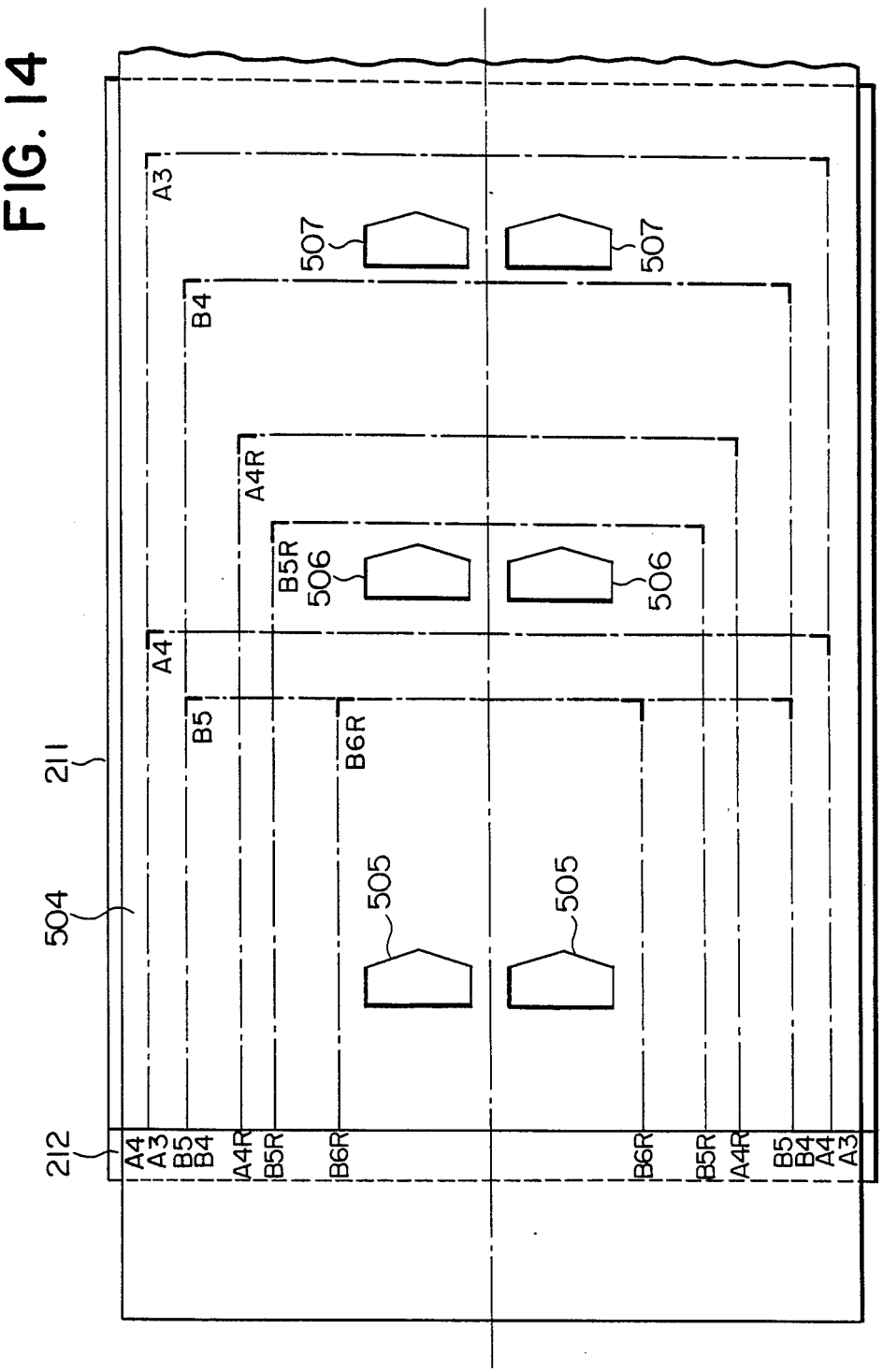
FIG. 14 is a top plan view to illustrate the positions of the holes of the present invention.

FIG. 14 is a plan view illustrating the locations of the holes 505, 506 and 507 on the sheet member 504 according to the invention.

In this figure, the long and short dash lines indicate the peripheral sides of documents of various sizes, each of which is placed and stopped at a fixed position on the platen glass 211 by interfering with the stopper plate 212. The fixed positions for the documents of various sizes are as follows: the position for B6-size document set sideways (B6R); the position for B5-size document set lengthways (B5); the position for B5-size document set sideways (B5R); the position for A4-size document set lengthways (A4); the position for A4-size document set sideways (A4R); the position for B4-size document set sideways (B4); the position for A3-size document set sideways (A3).

Corresponding to the above various sizes of documents, six holes are totally formed on the white sheet member 504 so as to press any document. More specifically, two holes 505 are located near the stopper plate 212, two holes are located near the right peripheral side of an A3-size document, and two holes are located between them. The edges of these holes are each located more than approximately 5 mm distance from the right peripheral side of each document so as not to interfere with the right edge side of each document B6R-,B5- and A4-size documents are each fed on the platen glass 211 by the document transport rollers 501 protruded through the holes 505. Further, B5R-, A4R- and B4-size documents are each fed by the document transport rollers 502 protruded through the holes 506, and by the similar rollers 501. Furthermore, an A3-size document is fed by the document transport rollers 503 protruded through the holes 507, and by the similar rollers 501 and 502.

The transport and ejection process of a document D is described below.

A document D having been fed from the document feed section 400 onto the platen glass 211 is made to slide on the platen glass 211 by the transport rollers 501, 502 and 503 until the trailing edge of the document D has passed the stopper 212 (stopper plate) for the trailing edge of document.

When the trailing edge of the document D being currently fed has passed the previously-mentioned document detecting sensor 441, a signal indicating that the trailing edge of the document has been detected is produced. After that, a fixed number of pulses are counted.

When a fixed number of pulses has been counted up, the main motor shifts from forward rotation to reverse rotation, and the second document feed rollers 426 are slightly reversed, whereby the trailing edge of the document D interferes with the stopper plate 212. This allows the document D to be set at a fixed position on the platen glass 211.

Then, after the count of a fixed number of pulses, the sheet member 504 presses the document D on the platen glass 211, and the exposure and scanning of the document and the image forming process are started.

After the exposure and scanning, the document D passes the transport section 500, and is further pinched and ejected by an ejection roller 601 and pinch rollers 602 and 603 in the document ejection section 600, whereby the document D is placed on an ejection tray disposed outside the ejection section 600.

When the leading edge or trailing edge of the document D is detected by an ejection sensor 604, the next document begins to be fed in the same manner as mentioned above.

Figure 15:
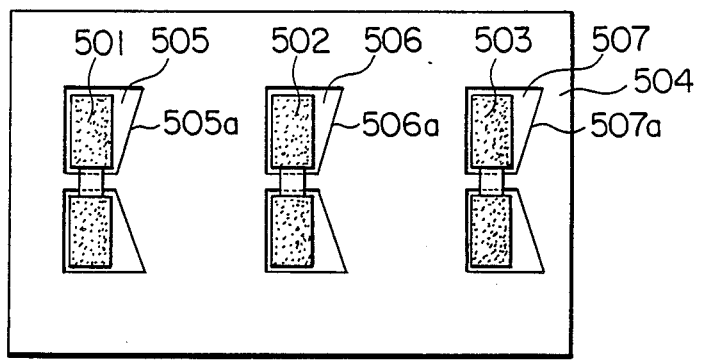
FIG. 15 is a top plan view to illustrate one type of shape of the holes of the present invention.
Figure 16:
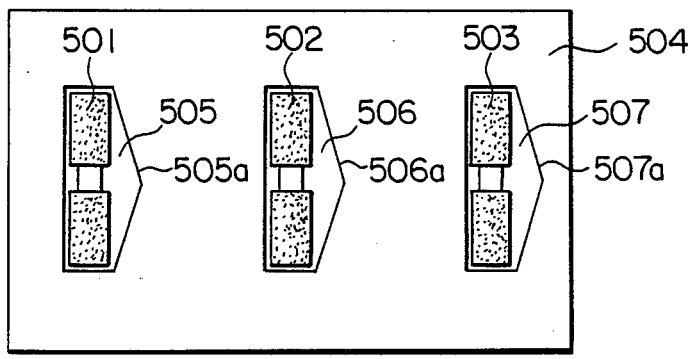
FIG. 16 is a top plan view to illustrate another type of shape of holes of the present invention.
Figure 17:
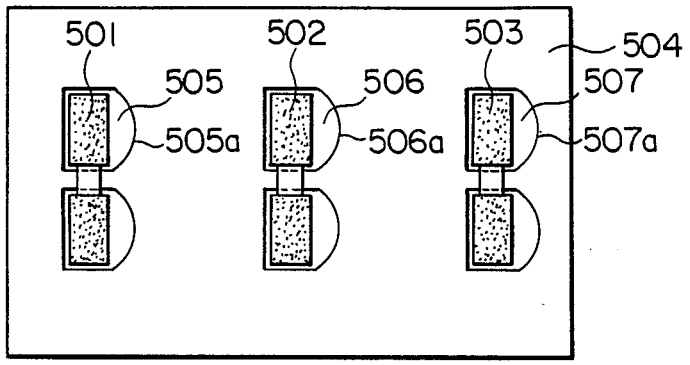
FIG. 17 is a top plan view to illustrate further another type of shape of holes of the present invention.

FIG. 15, 16 and 17 show some of the examples of the holes formed on the white sheet.

The shape of the hole formed on the white sheet has features that the peripheral shape of the hole of the document sheet delivery side has an inclination of angle to the center line of the rotation of the transport roller.

As mentioned above, the document feeder according to the present invention is a document feeder using rollers, which has realized a thinner and more serviceable apparatus. This document feeder is characterized in that holes are formed at the proper positions on a white sheet member for pressing a document on a platen glass so as to allow document transport rollers to be protruded through the holes. It is also characterized in that the holes and document transport rollers are located so that the edges of the holes may not be near or contact with the peripheral edges of a document of each size set at a fixed position. Accordingly, when the image of a document set on the platen glass is exposed to light to form a copied image on a recording paper through the image forming process, there is no possibility of producing a shadow image due to the holes or transport rollers.

Therefore, a copied image is allowed to be positively formed on the recording paper from edge to edge.

What is claimed is:

1. A document feeder for an electrophotographic copying machine, said document feeder having transport rollers driven by a drive unit to carry a document sheet, comprising
   (a) a flexible sheet having holes on a platen glass; and
   (b) document transport rollers contacting a document sheet on said platen glass through said holes in said flexible sheet to carry said document sheet on said platen glass, means for controlling the tension of said flexible sheet, said flexible sheet being tightened and apart from said document sheet when said document sheet is carried onto said platen glass by said transport rollers, said flexible sheet being loosened and in contact with said document sheet when said document sheet is exposed to light, and said flexible sheet tension control means has a sheet pressing means to rigidly tighten said flexible sheet.

2. The document feeder for an electrophotographic copying machine as set forth in claim 1, wherein said flexible sheet is equipped with plural lines of holes for said transport rollers along the center line of said flexible sheet.

3. The document feeder for an electrophotographic copying machine as set forth in claim 1, wherein said flexible sheet is equipped with plural lines of holes for said transport rollers along the center line of said flexible sheet.

4. The document feeder for an electrophotographic copying machine as set forth in claim 1, wherein said holes in said flexible sheet are positioned so as not to overlap peripheral sides of a document sheet which is set at the correct position on said platen glass to be exposed to light.

5. The document feeder for an electrophotographic copying machine as set forth in claim 1, wherein said holes in said flexible sheet are positioned so as not to overlap peripheral sides of a document sheet which is set at the correct position on said platen glass to be exposed to light.

* * * * *